US009229643B2

(12) United States Patent
Botzer (10) Patent No.: US 9,229,643 B2
(45) Date of Patent: Jan. 5, 2016

(54) COMPATIBLE VIRTUAL MACHINE JOINER (71) Applicant: Red Hat Israel, Ltd., Raanana (IL)

(72) Inventor: David Botzer, Kfar Yona (IL)

(73) Assignee: Red Hat Israel, Ltd., Raanana (IL)

( * ) Notice: Subject to any disclaimer, the term of this patent is extended or adjusted under 35 U.S.C. 154(b) by 279 days.

(21) Appl. No.: 14/045,314

(22) Filed: Oct. 3, 2013

(65) Prior Publication Data

US 2015/0100742 A1 Apr. 9, 2015

(51) Int. Cl.
*G06F 3/06* (2006.01)
*G06F 9/445* (2006.01)
*G06F 12/08* (2006.01)
*G06F 9/455* (2006.01)

(52) U.S. Cl.
CPC .............. *G06F 3/0619* (2013.01); *G06F 3/065* (2013.01); *G06F 3/0644* (2013.01); *G06F 3/0689* (2013.01); *G06F 12/08* (2013.01); *G06F 2009/45562* (2013.01); *G06F 2009/45583* (2013.01)

(58) Field of Classification Search
CPC ... G06F 3/0608; G06F 3/0631; G06F 3/0644; G06F 3/065; G06F 3/0662; G06F 3/0665; G06F 9/45504; G06F 9/45537; G06F 2009/45562; G06F 2009/4557; G06F 2009/45583; G06F 12/023; G06F 12/08
See application file for complete search history.

(56) References Cited

U.S. PATENT DOCUMENTS 8,458,392 B2    6/2013  Gao et al.
2013/0145367 A1 6/2013  Moss et al.

FOREIGN PATENT DOCUMENTS

CN    102611622        7/2012
EP      1056002       11/2000
WO    WO2012001444    1/2012
WO    WO2012001445    1/2012
WO    WO2012165937   12/2012

OTHER PUBLICATIONS

Wang, et al., "The Cumulus Project: Build a Scientific Cloud for a Data Center", Department of Computer Science, University Karlsruhe, 7 pages.
Hu, et al., "Magnet: A Novel Scheduling Policy for Power Reduction in Cluster with Virtual Machines", School of Computer Science and Technology, Huazhong University of Science and Technology, 10 pages.

*Primary Examiner* — Hal Schnee
(74) *Attorney, Agent, or Firm* — Lowenstein Sandler LLP (57) ABSTRACT A method, system and computer readable medium for joining multiple virtual machines (VMs). The method includes identifying a first virtual machine (VM) executing a first operating system (OS) for joining with a second VM executing a second OS, wherein the first OS and the second OS are compatible. A new VM having a new disk is created, wherein the new disk includes the contents of a first existing disk of the first VM and a second existing disk of the second VM.

20 Claims, 6 Drawing Sheets

COMPATIBLE VIRTUAL MACHINE JOINER

TECHNICAL FIELD

Embodiments of the present disclosure relate to virtual computing environments, and more specifically, to a method and system for joining multiple virtual machines.

BACKGROUND

In computer science, a virtual machine (VM) is a portion of software that, when executed on appropriate hardware, creates an environment allowing the virtualization of an actual physical computer system. A computing environment may include many virtual machines (VMs) utilizing computing resources. In a conventional system, there is an increased burden on a virtual machine management system to manage a computing environment including a large number of VMs. In addition to the aforementioned management issues, having many VMs can lead to increased load on the system, a slower migration, a lack of resource sharing, a reduction in a number of host computers, and an increased need for per VM software licenses

DETAILED DESCRIPTION

In a virtual machine computing environment including multiple virtual machine (VM) instances, it may be desired to reduce the number of VMs by joining two or more VMs. In a conventional system, there is an increased burden on a virtual machine management system to manage a computing environment including a large number of VMs. In addition to the aforementioned management issues, having many VMs can lead to increased load on the system, a slower migration, a lack of resource sharing, a reduction in a number of host computers, high memory fragmentation on a host computer, improper storage management, and an increased need for per VM software licenses. In this regard, a number of efficiencies may be realized by a system wherein multiple VMs are joined, while enabling continued use of the joined VMs in the same manner as they were prior to the joining.

The present disclosure relates to VM joining methods and systems that provide for the efficient joining of multiple VMs. Advantageously, a VM joiner module is provided which allows a user to join any number of VMs in a computing environment, while preserving the operational characteristics of the joined VMs. The operational characteristics of the VMs may include any settings, information (e.g., state information), configurations, etc. of any hardware and/or software components associated with the VMs.

In an embodiment, the VM joiner module may be deployed within a virtual machine management system (e.g., the Red Hat Enterprise Virtualization Manager or RHEV-M) configured to manage multiple VMs in a VM computing environment. In another embodiment, the VM joiner module may be deployed as an application configured to manage multiple VMs in a VM computing environment.

In the following description, numerous details are set forth. It will be apparent, however, to one skilled in the art, that the present disclosure may be practiced without these specific details. In some instances, well-known structures and devices are shown in block diagram form, rather than in detail, in order to avoid obscuring the present disclosure.

Figure 1:
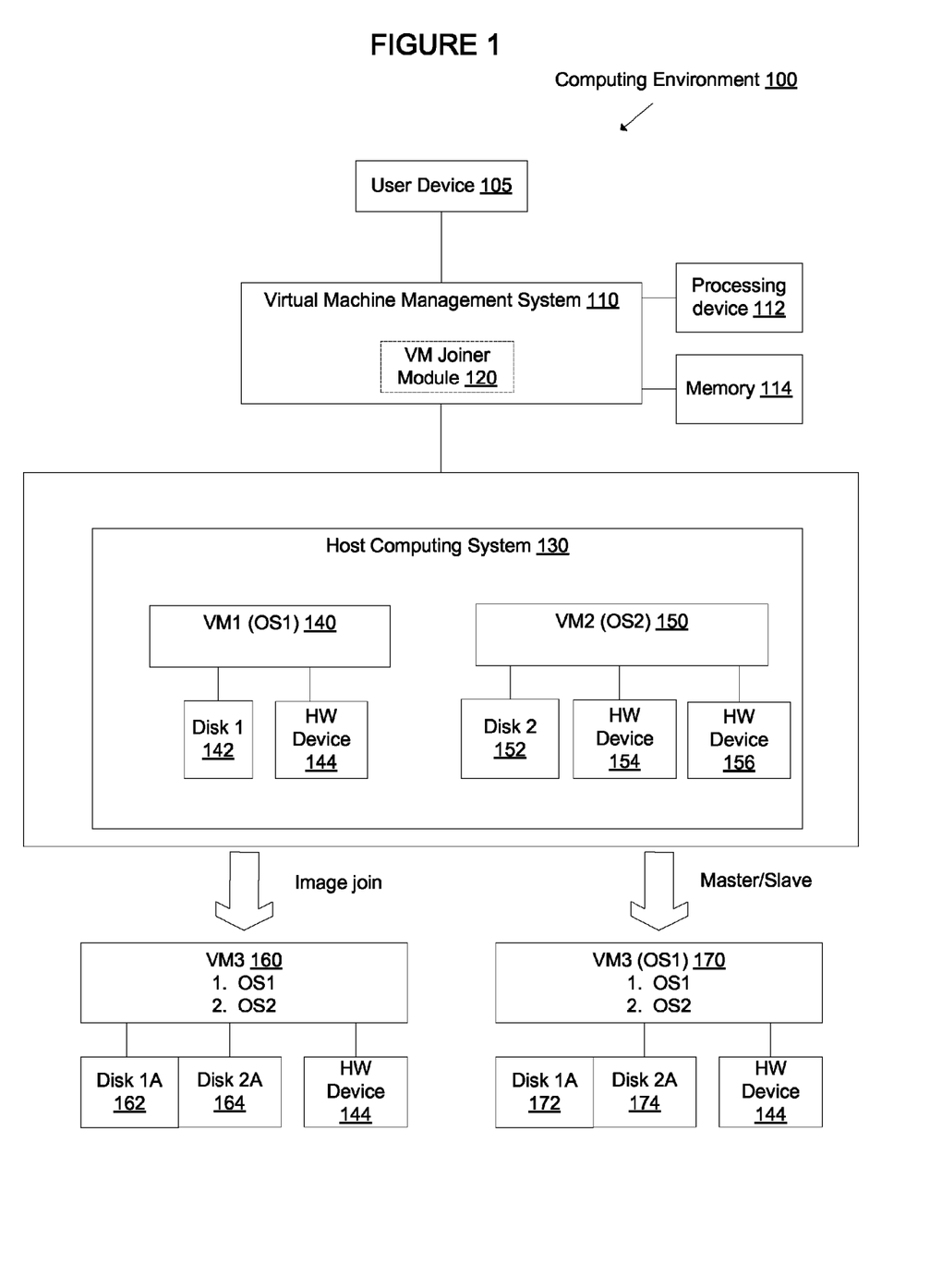
FIG. 1 is a block diagram of an example system for joining multiple virtual machines, according to aspects of the present disclosure.

FIG. 1 is a block diagram that illustrates an example VM computing environment 100 including a virtual machine management system 110 having a VM joiner module 120 in communication with one or more user devices 105 via a network (e.g., a public network such as the Internet, a private network such as a local area network (LAN), or a virtual private network (VPN)).

The VM joiner module 120 is a software component (e.g., a set of instructions residing in memory 114) executable by one or more processing devices (e.g., processing device 112) to perform the VM joining activities described herein (e.g., the methods described in detail in connection with FIGS. 2-4). Memory 114 may be any suitable computer readable storage medium, including volatile memory devices (e.g., random access memory (RAM)), non-volatile memory devices (e.g., flash memory), a magnetic hard disk, a Universal Serial Bus (USB) solid state drive, etc., a local disk, an external disk, and/or other types of memory devices).

Figure 2:
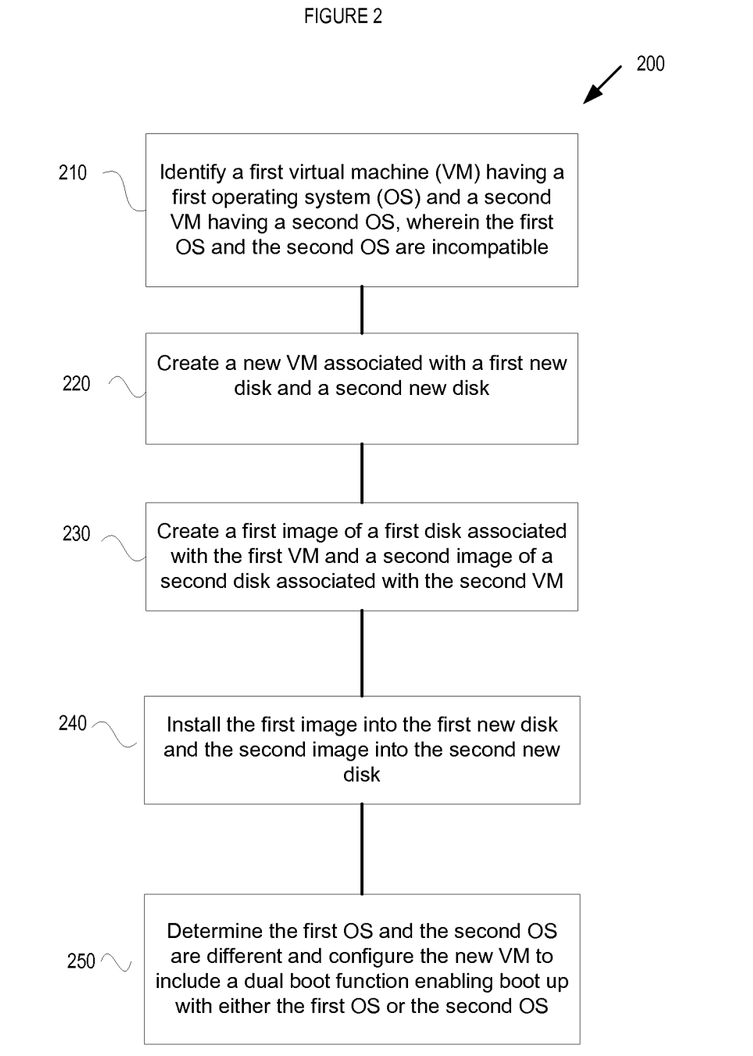
FIG. 2 is a flow diagram of an example method for joining multiple virtual machines, according to aspects of the present disclosure.

According to an embodiment, the VM joiner module 120 is configured to communicate with a user (e.g., an administrator responsible for creating, managing, and monitoring VMs in the VM computing environment 100) via a user device 105 in the execution of a VM joining process, as detailed in FIG. 2. The user device 105 may be any suitable computing system, such as a server, a workstation, a personal computer (PC), a mobile phone, a palm-sized computing device, a personal digital assistant (PDA), a virtual computing system, etc. In an embodiment, the VM joiner module 120 may provide to the user device 105 a graphical user interface (GUI) associated with the VM joiner module 120 or the virtual machine management system 110 (e.g., a server including hardware and software components configured to manage a collection of VMs, such as, the Red Hat Enterprise Virtualization Manager or RHEV-M).

According to aspects of the present disclosure, the VM joiner module 120 is configured to join multiple VMs running on one or more host computing systems (e.g., host computing system 130). The host computing system 100 may be any suitable computing system, such as a server, a workstation, a personal computer (PC), a mobile phone, a palm-sized computing device, a personal digital assistant (PDA), a virtual computing system, etc. Although FIGS. 1-4 describe exemplary embodiments wherein two VMs are joined, according to aspects of the present disclosure, any number of VMs may be joined by the VM joiner module 120 in accordance with the methods described herein.

In an embodiment, the VM joiner module 120 may be an application (as depicted by a dashed line) which is not integrated within the virtual machine management system 110, but is used by the virtual machine management system 110 or deployed independently from the virtual machine management system 110 (i.e., a standalone application accessed directly by the user device 105, residing on a different machine than the virtual machine management system 110, and coupled to the virtual machine management system 110 via a network).

In the example shown in FIG. 1, the host computing system 130 includes a first VM (VM1) 140 and a second VM (VM2) 150 to be joined by the VM joiner module 120. In the example shown in FIG. 1, VM1 has a first operating system (OS1) and VM2 has a second operating system (OS2), wherein OS1 and OS2 are of different operating system types or different versions of the same operating system type. For example, OS1 may be the Red Hat Enterprise Linux (RHEL) operating system and OS2 may be a Microsoft Windows® operating system. It is noted that any suitable operating system may be employed in accordance with the present disclosure.

The various components of the host computing system 130 may reside on different computing devices and may be physically or virtually located in any number of different locations. Accordingly, any desired distributed arrangement of the host computing system 130 may be achieved. Furthermore, according to aspects of the present disclosure, the VMs to be joined (e.g., VM1 140 and VM2 150) may be hosted on different host computing systems 130, and the product of the joining processes (e.g., VM3 160) may be hosted on a different host computing system from the host computing system (s) of the two or more VMs that are joined.

VM1 140 is associated with one or more software components (not shown) and/or hardware components, including a disk device (Disk 1) 142 and an example hardware device (HW Device) 144. With reference to FIG. 1, VM2 150 is associated with one or more software components (not shown) and/or hardware components, including a disk device (Disk 2) 152 and two example hardware devices (HW Device) 154, 156. Although VM1 and VM2 may be associated with any number of software components and/or hardware components, FIG. 1 depicts VM1 and VM2 in association with the aforementioned exemplary hardware components for purposes of illustration.

According to embodiments of the present disclosure, the software components associated with the VMs (e.g., VM1 140 and VM2 150) of the computing environment 100 may include any suitable software that is executed, used by, or accessed by the VMs. According to embodiments of the present disclosure, the hardware components associated with the VMs (e.g., VM1 140 and VM2 150) of the computing environment 100 may include any suitable hardware device, such as, for example, a central processing unit (CPU), a disk device (e.g., Disk 1 142 and Disk 2 152), a network interface controller (NIC), a memory device, a sound adapter, a graphics adapter, etc.

As a result of the joining process described in connection with FIG. 2 (referred to as an "image join" process and represented by the arrow labeled "image join" in FIG. 1) and performed by the VM joiner module 120, VM1 and VM2 are joined into a new VM (VM3) 160. According to an embodiment of the present disclosure, FIG. 1 illustrates an example wherein OS1 is different from OS2 (e.g., a different OS type or a different version of the same OS type). Accordingly, VM3 is shown as having a dual boot OS mode enabling the booting of VM3 160 with either OS1 or OS2. According to aspects of the present disclosure, the "dual" boot mode may enable booting in more than two OS types or OS versions of the same type in the event that more than two VMs having different OS types or versions are joined. The VM creation by the VM joiner module 120 (e.g., VM3) according to the image join process is described below in connection with the method of FIG. 2.

FIG. 2 is a flow diagram illustrating an example of a method 200 relating to the joining of two or more VMs having different or incompatible OSs and/or hardware components, in accordance with aspects of the present disclosure. In an example, the method 200 may be performed by a module (e.g., VM joiner module 120 of FIG. 1) that may include hardware (e.g., circuitry, dedicated logic, programmable logic, microcode, etc.), software (e.g., instructions executed by a processing device), or a combination thereof.

In block 210, the VM joiner module identifies a first VM having a first operating system (e.g., VM1 140 with OS1 in FIG. 1) and a second VM having a second operating system (e.g., VM2 150 with OS2 in FIG. 2), wherein the first VM and the second VM are to be joined. In an embodiment, the first VM and the second VM may be identified as a result of an instruction, request, indication, etc. received from a user via a user device (e.g., user device 105 in FIG. 1) in communication with the VM joiner module. In an embodiment, one or more parameters relating to the VMs of a computing environment (e.g., VM settings or properties such as operating system type and version, associated hardware types and versions, host computer name, configuration information, VM type (e.g., desktop, server, etc.), VM availability (e.g., high availability, medium availability, low availability), console type (e.g., Spice, Virtual Network Computing console, etc.), one or more applications) may be selected, identified, or set for use by the VM joiner module in identifying two or more VMs to be joined.

In block 220, in order to join VM1 and VM2, the VM joiner module creates a new VM (e.g., VM3 160 in FIG. 1) associated with a first new disk (e.g., Disk 1A 162 in FIG. 1) and a second new disk (e.g., Disk 2A 164 in FIG. 1). According to an aspect of the present disclosure, it is noted that the "new" VM and its "new" disks may include an existing VM instance, image or template and associated disks which are reallocated, repurposed, or reassigned for purposes of joining the identified VMs (e.g., VM1 and VM2).

In block 230, the VM joiner module creates a first image of a first disk associated with the first VM and a second image of a second disk associated with the second VM. As used herein, the term "image" refers to any reproduction or copy of the contents and structure representing the source disk (e.g., Disk 1 142, Disk 2 152 of FIG. 1), such as, for example, an ISO image. According to aspects of the present invention, blocks 220 and 230 may be performed serially in any order, or in parallel.

Having created the images of the disks corresponding to the VMs to be joined, in block 240, the first image (of the first disk corresponding to VM1) is installed on the first new disk (e.g., Disk 1A 162 in FIG. 1) and the second image (of the second disk corresponding to VM2) is installed on the second new disk (e.g., Disk 2A 164 in FIG. 1). In this regard, the disks of the new VM include the information associated with the VMs that have been joined, thereby preserving the VMs for continued use and operation.

In block 250, in view of a determination that the first OS and the second OS are different (e.g., a different OS type (such as RHEL vs. Windows) or a different version of the same type (such as RHEL version 6 vs. RHEL version 7), the VM joiner module configures the new VM to include a dual boot function enabling boot up with either the first OS or the second OS, as shown in the example VM3 160 of FIG. 1 (including a dual boot function for boot up with OS1 or OS2).

According to aspects of the present disclosure, the VM joiner module may also determine whether the hardware components associated with the VMs being joined are compatible. If so, the compatible hardware components are associated with the new VM. If it is determined that the hardware components are not compatible, the VM joiner module may select which hardware components to associate with the new VM. In the example shown in FIG. 1, HW Device 144, associated with the first VM being joined (VM1 140) is selected for association with the new VM (e.g., VM3 160).

In an embodiment, the one or more hardware components to be associated with the new VM may be selected by the user (e.g., via user device 105). In the example shown in FIG. 1, from the set of hardware components associated with the two VMs being joined (e.g., HW Device 144, HW Device 154 and HW Device 156), the user selects HW Device 144 for association with the new VM. According to an embodiment of the present disclosure, a user may be presented with a list (e.g., a drop-down list box) of the hardware components of the VMs being joined, and provided with an interface for entering the user's selection of the one or more hardware components to be associated with the new VM. According to an embodiment, all of the hardware components associated with the VMs may automatically be associated with the new VM. According to an embodiment, the selected hardware components for association with the new VM are created as new devices having unique properties and values (e.g., unique addresses such as a MAC address, an IP address, a resource address (e.g., memory-address range, IRQ, etc.).

According to an aspect of the present disclosure, following creation and configuration of the new VM, the "old" VMs (e.g., the original VMs which have been joined) may be automatically deleted by the VM joiner module, deleted after a preset period of time to allow for examination of the operation of the new VM3, or deleted upon receipt of a delete instruction from the user.

In another embodiment, a "master/slave" joining method 300 may be employed, as described in connection with FIG. 3. As shown in FIG. 1, as a result of the master/slave joining process (represented by the arrow labeled "master/slave" in FIG. 1), the VM joiner module 120 is configured to join VM1 (identified as the "master") and VM2 (identified as the "slave") into VM3 170.

Figure 3:
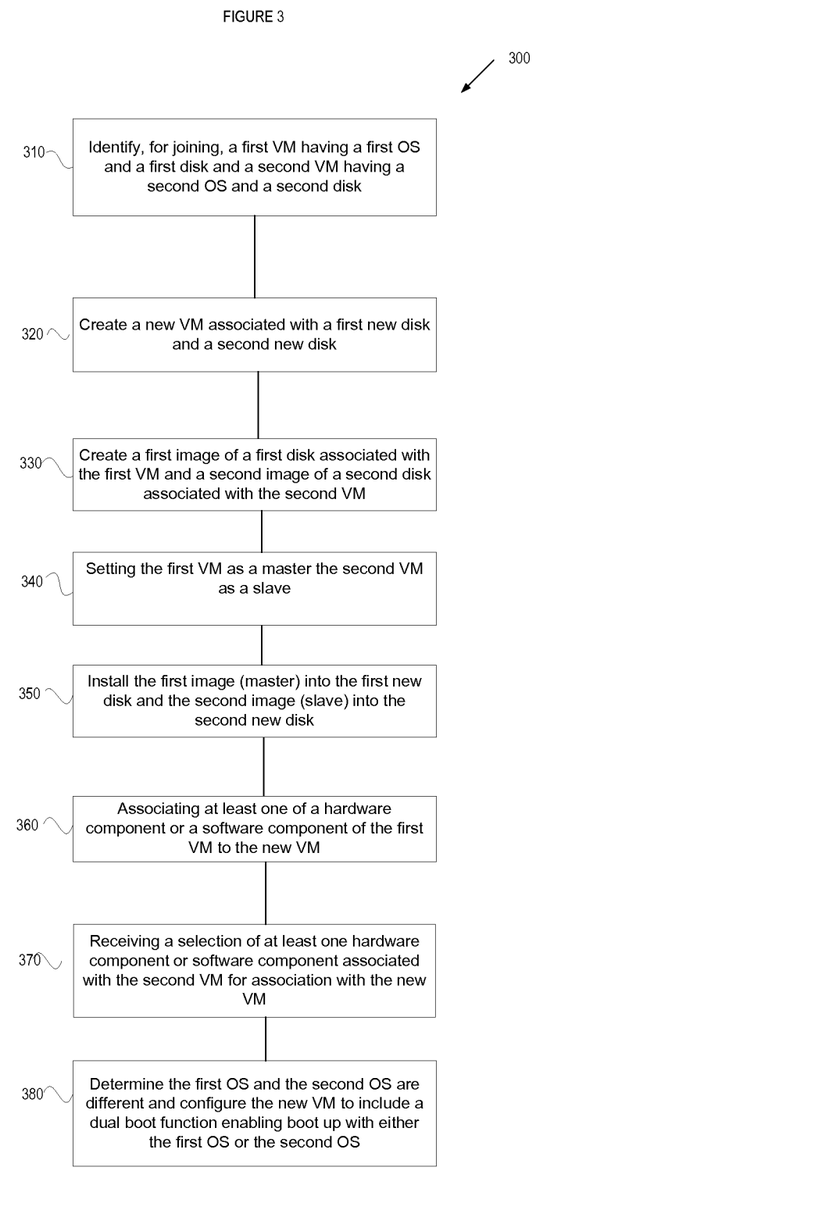
FIG. 3 is a block diagram of an example system for joining multiple virtual machines, according to aspects of the present disclosure
Figure 4:
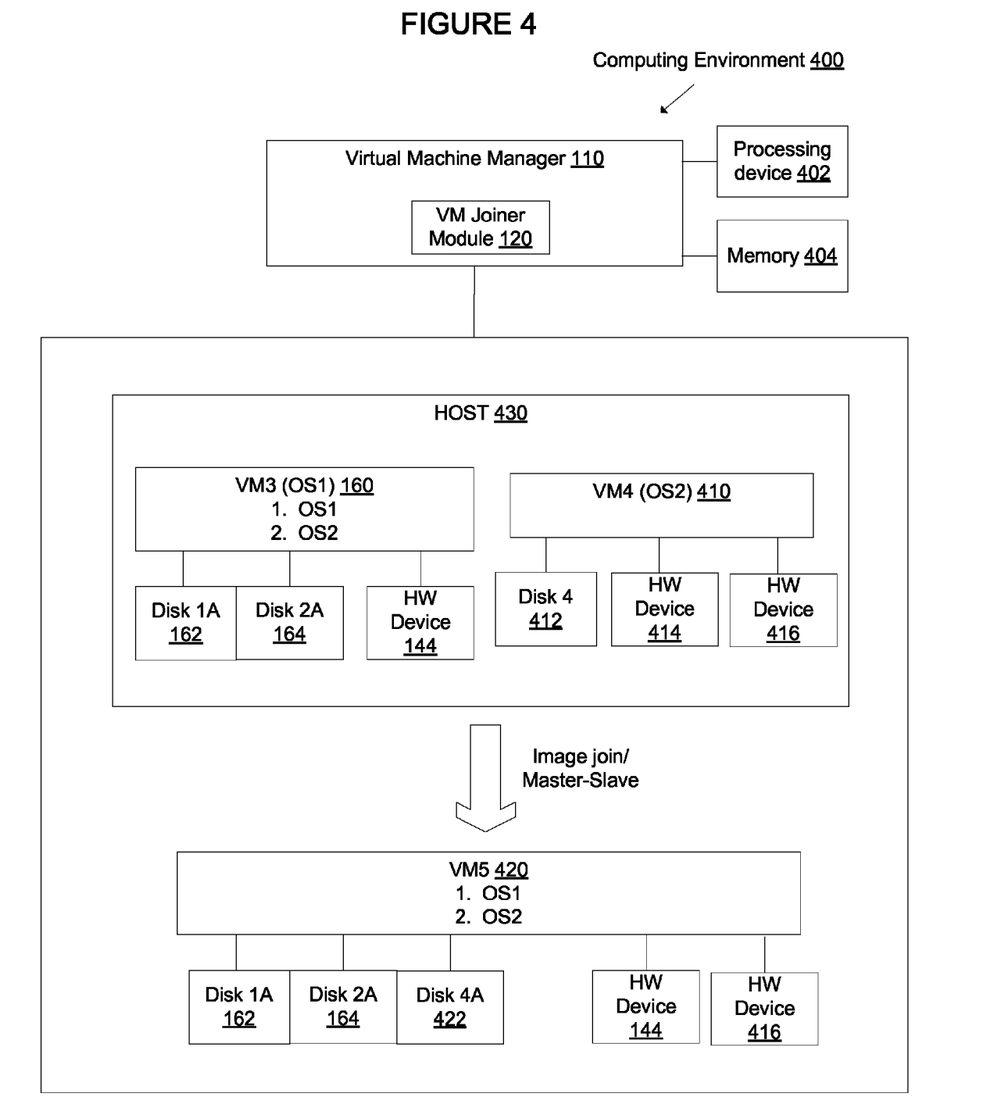
FIG. 4 is a flow diagram of an example method for joining multiple virtual machines, according to aspects of the present disclosure.

FIG. 3 is a flow diagram illustrating an example of a master-slave method 300 for the joining of two or more VMs having different or incompatible OSs and/or hardware components, in accordance with aspects of the present disclosure. In an example, the method 300 may be performed by a module (e.g., VM joiner module 120 of FIG. 1) that may include hardware (e.g., circuitry, dedicated logic, programmable logic, microcode, etc.), software (e.g., instructions executed by a processing device), or a combination thereof.

In block 310, the VM joiner module identifies a first VM having a first operating system (e.g., VM1 140 with OS1 in FIG. 1) and a second VM having a second operating system (e.g., VM2 150 with OS2 in FIG. 2), wherein the first VM and the second VM are to be joined. In an embodiment, the first VM and the second VM may be identified as a result of an instruction, request, indication, etc. received from a user via a user device (e.g., user device 105 in FIG. 1) in communication with the VM joiner module. In an embodiment, one or more parameters relating to the VMs of a computing environment (e.g., VM settings or properties) may be selected, identified, or set for use by the VM joiner module in identifying two or more VMs to be joined.

In block 320, in order to join VM1 and VM2, the VM joiner module creates a new VM associated with a first new disk (e.g., Disk 1A 172 in FIG. 1) and a second new disk (e.g., Disk 2A 174 in FIG. 1). According to an aspect of the present disclosure, it is noted that the "new" VM and its "new" disks may include an existing VM and disks which are reallocated, repurposed, or reassigned for purposes of joining the identified VMs (e.g., VM1 and VM2).

In block 330, the VM joiner module creates a first image of a first disk associated with the first VM and a second image of a second disk associated with the second VM. In block 340, one of the first VM or the second VM is selected as the "master" and the other is selected as the "slave", for purposes of configuring the new VM. In an embodiment, a selection of the VM which is to be the master is made by the user. In operation, the slave VM is integrated into the master VM, as described below. In the example shown in FIGS. 1 and 3, the first VM (e.g., VM1 140) is set as the master and the second VM is set as the slave. According to aspects of the present invention, blocks 320, 330 and 340 may be performed serially in any order, or in parallel.

In block 350, since the first VM is the master, the first image (corresponding to the first disk of VM1) is installed into the first new disk of the new VM (e.g., Disk 1A 172 of FIG. 1) and the first OS is established as a primary OS of the new VM (e.g., the first OS is set as the default and booted first). In addition, as the slave, the second image (corresponding to the second disk of VM2) is installed into the second new disk of the new VM (e.g., Disk 2A 174 of FIG. 1).

In block 360, the one or more hardware components and/or software components associated with the first VM (the master) are associated with the new VM. For example, as shown in FIG. 1, HW Device 144 which is associated with VM1 is associated with the new VM. Although FIG. 1 depicts an example wherein one hardware component (HW Device 144) is associated with the master VM, any number of hardware and software components of the master VM (e.g., VM1) may be associated with the new VM. In addition, as shown in FIG. 1, since VM1 is set as the master, the new VM (VM3) 170 is configured to include a first disk (Disk 1A 172) corresponding to the disk of the master VM (VM1 140) and the hardware component (HW Device 144) associated with the master VM. In addition, the operating system associated with the master VM (e.g., OS1 of VM1) is established as the primary operating system of the new VM (e.g., the new VM is booted up in OS1 by default).

In block 370, the VM joiner module may identify one or more hardware and/or software components of the second VM (the slave) for association with the new VM. In an embodiment, the user may provide an indication, command, instruction or request to the VM joiner module of the hardware and/or software components to have associated with the new VM. For example, the user may select how many network interface devices of the slave (VM2) to retain on the master.

In block 380, in view of a determination that the first OS and the second OS are different (e.g., a different OS type (such as RHEL vs. Windows) or a different version of the same type (such as RHEL version 6 vs. RHEL version 7), the VM joiner module configures the new VM to have the operating system of the master VM (e.g., OS1) as its primary OS, and provides a dual boot function enabling boot up with either the first OS or the second OS, as shown in the example VM3 160 of FIG. 1 (including a dual boot function for boot up with OS1 or OS2).

According to aspects of the present disclosure, the joining methods described in connection with FIGS. 2 and 3 may be applied iteratively to a computing environment 400, wherein a VM joiner module 120 (associated with a processing device 402 and a memory 404) is configured to join a new VM (representing two or more previously joined VMs) with one or more additional VMs. Advantageously, as shown in FIG. 4, the VM joiner module 120 may join VM3 160 (created according to method 200) which represents joined VM1 140 and VM2 150 with another VM (e.g., VM4 410) associated with a disk (e.g., Disk 4 412) and two hardware components (e.g., HW Device 414 and HW Device 416), running, for example, on host computing system 430. Using either the image join or the master/slave joining method, a new VM (e.g., VM5 420) may be created which represents the joining of VM4 and VM3. The new VM may include Disk 1A 162 (corresponding to the image of VM1), Disk 2A 164 (corresponding to the image of VM2) and Disk 4A 422 (corresponding to the image of VM4). In addition, VM5 420 may be associated with one or more hardware and/or software components of VM1, VM2 and/or VM4, such as, for example, HW Device 144 (of VM1) and HW Device 416 (of VM4).

Figure 5:
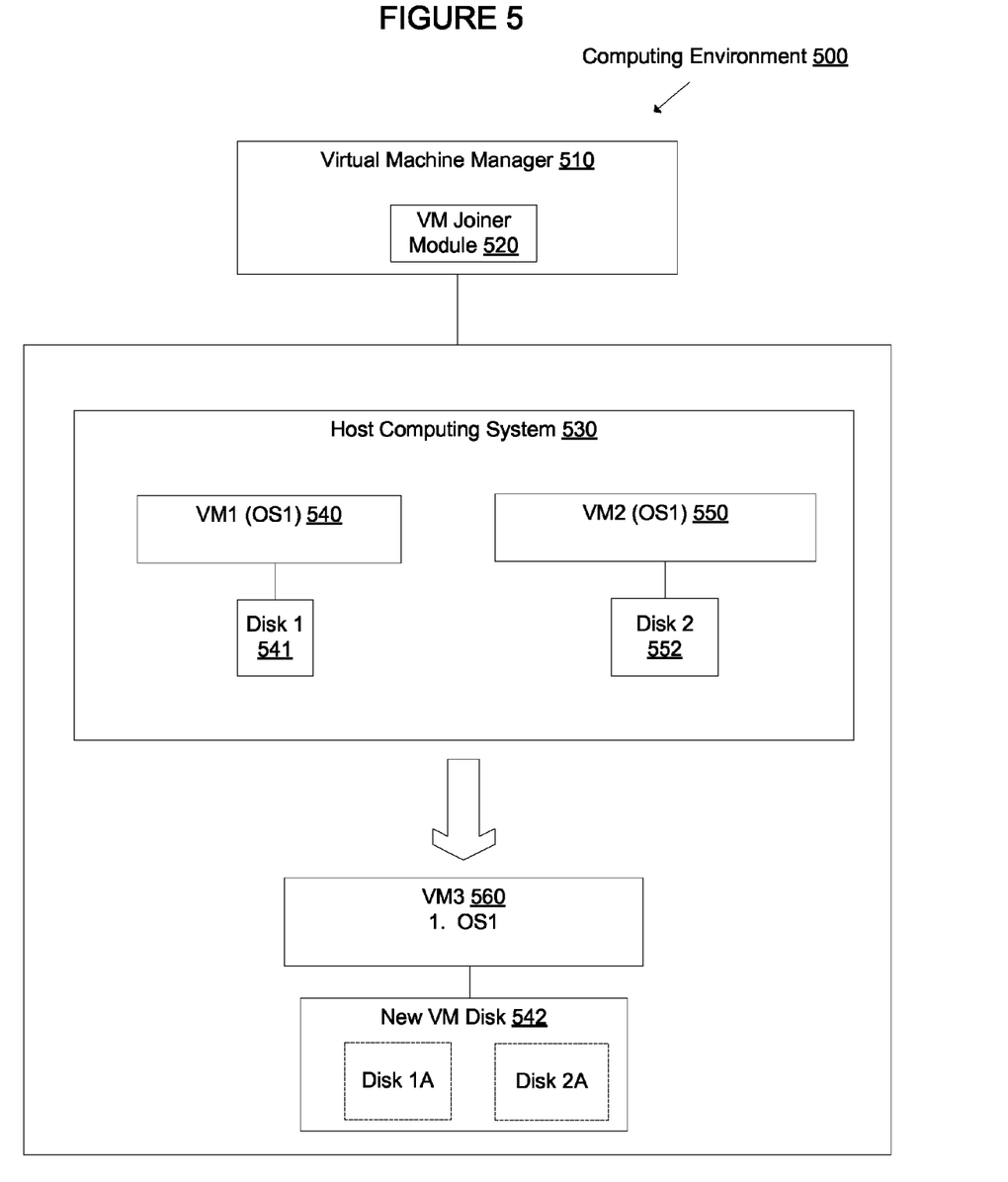
FIG. 5 is a block diagram of an example system for joining multiple compatible virtual machines, according to aspects of the present disclosure.

FIG. 5 illustrates a virtual machine computing environment 500 including a VM Manager 510 including a VM joiner module 520 for joining multiple VMs (VM1 520 and VM2 530) having compatible OSs and hardware. As shown in FIG. 5, the VMs to be joined may reside on a single host computing system 510. Alternatively, the multiple VMs to be joined may be hosted by multiple host computing systems. In the example shown in FIG. 5, a first VM (VM1 540) and a second VM (VM2 550) both have a compatible OS (OS1). A new VM (VM3 560) with the compatible OS (OS1) may be generated in accordance with the methods described below. As shown in FIG. 5, the new VM is associated with a new disk (e.g., New VM Disk 542) including the contents of a first disk associated with VM1 540 (e.g., Disk 1 541) and the contents of a second disk associated with VM2 550 (e.g., Disk 2 552), according to one of the methods described below.

According to embodiments of the present disclosure, two or more VMs having compatible OSs and hardware components may be joined by a module (e.g., VM joiner module 520 of FIG. 5) that may include hardware (e.g., circuitry, dedicated logic, programmable logic, microcode, etc.), software (e.g., instructions executed by a processing device), or a combination thereof. According to aspects of the present disclosure, multiple methods for joining VMs having compatible OSs and hardware are disclosed. In a first exemplary approach, a first VM having a first disk and a second VM having a second disk are identified for joining, wherein the first VM and second VM have compatible OSs and hardware. In an embodiment, the VMs to be joined are identified by a user via a selection, request, indication, or instruction provided to the VM joiner module.

In an embodiment, a new VM is created and associated with a new disk. According to an aspect of the present disclosure, the new disk may be the aggregate size of the first disk and the second disk (e.g., the size of the new disk=the size of the first disk+the size of the second disk). In another embodiment, the new disk may be an expandable thin provision disk type. In an embodiment, the VM joiner module copies the first disk and the second disk into the new disk (e.g., New VM Disk 542 of FIG. 5). According to an embodiment, the copies of each disk are maintained in respective folders on the third disk. In an embodiment, an image of the first disk and an image of the second disk are extracted into the third disk, wherein two sets of folders or storage directory is maintained for the respective copies of the disks.

In an embodiment, the new disk of the new VM may include two system partitions, with each partition appropriately sized to correspond with the respective disks of the two VMs being joined (e.g., the first disk and the second disk).

According to this embodiment, an image of the first disk and an image of the second disk are extracted into the corresponding partition of the third disk.

In another embodiment, after a first VM having a first disk and a second VM having a second disk are identified for joining, wherein the first VM and second VM have compatible OSs and hardware, in order to avoid downtime of the first VM and the second VM, a VM joiner module creates a snapshot of the first disk and a snapshot of the second disk. As used herein, the term "snapshot" is intended to include, but is not limited to, an online backup of a disk in which the disk remains active and available for read and write operations during the backup. In an embodiment, the VM joiner module creates a new VM (e.g., VM3 540 of FIG. 5) based on the snapshots (e.g., using a "clone VM from snapshot" option in an RHEV-M graphical user interface). Advantageously, according to the snapshot approach, during the creation of the new VM, the first VM and the second VM may continue to run and operate normally, without the risk of disrupting or corrupting those VMs. According to an embodiment, the respective "snapshot" files may be saved in the Open Virtualization Format (OVF), wherein the OVF file is an image file that represents the respective VM (e.g., the first VM or the second VM). In an embodiment, the snapshot files may be moved around with an application, such as, for example, the RHEVM—image-uploader application.

In yet another embodiment, after a first VM having a first disk and a second VM having a second disk are identified for joining, wherein the first VM and second VM have compatible OSs and hardware, the VM joiner module may employ a span volume (or spanned volume) approach to copy the first disk to a portion of a new disk (e.g., New VM Disk 542) associated with the new VM (e.g., copy Disk 1 522 to memory locations 0 to 1000 of the new disk). In an embodiment, an exemplary span volume approach employs a non-RAID drive architecture, such as JBOD, wherein data stored on each of the first disk and the second disk span respective portions of a volume of the new disk. Using the span volume approach, the VM joiner module may copy the second disk to the new disk (e.g., New VM Disk 542) associated with the new VM (e.g., copy Disk 532 to memory locations 1001 to 2000 of the new disk). In an embodiment, the disk of the new VM may be configured as one disk including one logical unit number (LUN) on one storage device, or one disk including several LUNs on one storage device. In an embodiment, the disk of the new VM may be configured as one disk including one LUN spanning several storage devices, or one disk having several LUNs spanning several storage devices. Advantageously, using a spanning volumes approach or a RAID method allows for a measure of recoverability in the event of a failure. For example, a user may employ the approach above if the goal is to not only join VMs, but also implement a new storage recovery method using a RAID system in a newly created environment. In another example, a user may employ the approach described above if changing the storage devices to support RAID.

Figure 6:
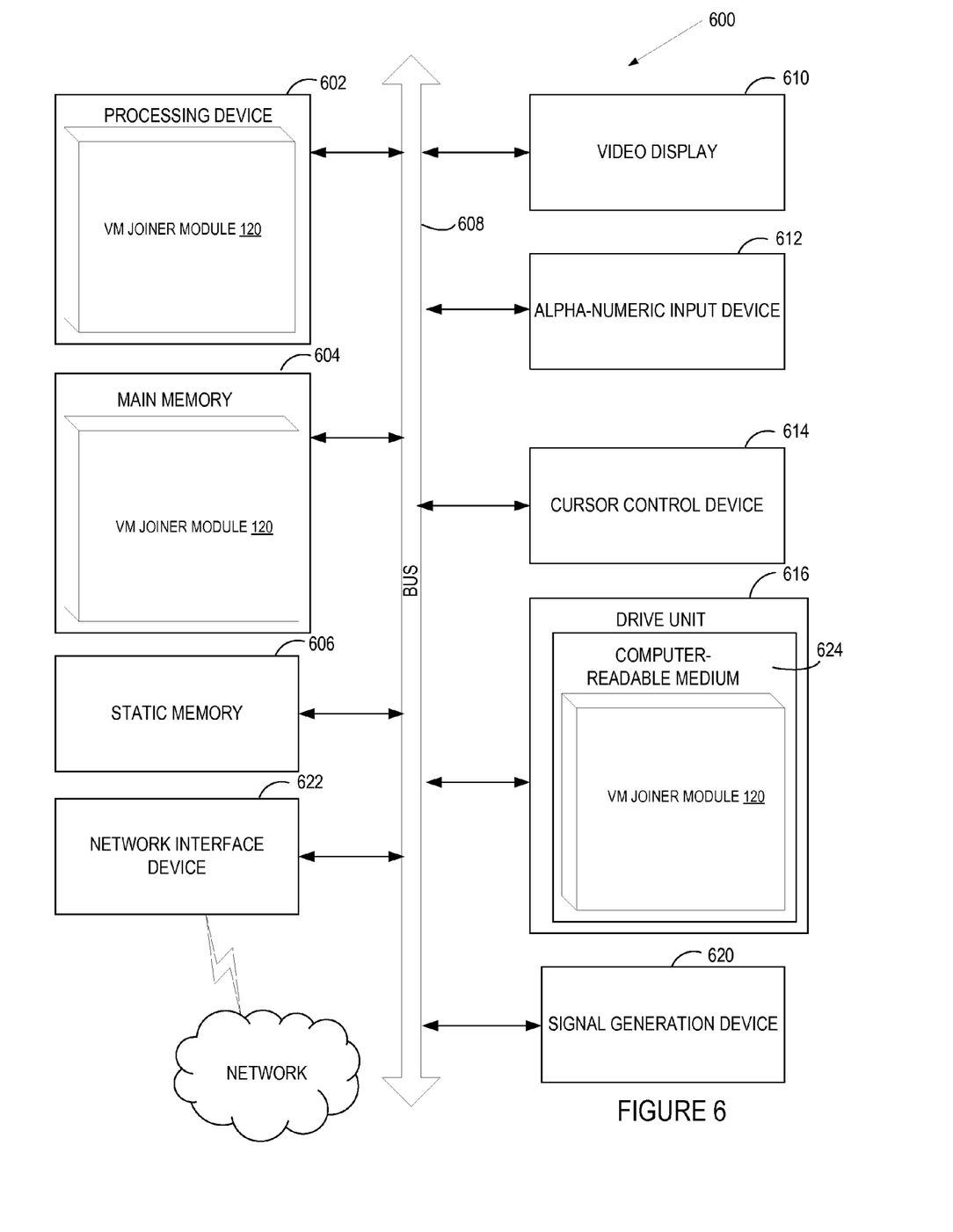
FIG. 6 illustrates a diagrammatic representation of a virtual machine joiner system, according to aspects of the present disclosure.

FIG. 6 illustrates an example computer system including a VM joiner module 120 configured to perform any one or more of the methodologies discussed herein. In alternative examples, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine.

Further, while only a single machine is illustrated, the term "machine" shall also be taken to include any collection of machines that individually or jointly execute a set (or multiple sets) of instructions to perform any one or more of the methodologies discussed herein. According to an aspect of the present disclosure, the illustrative computer system 600 may be composed of multiple different computer systems configured to execute VM joiner module 120.

The illustrative computer system 600 includes a processing device (processor) 602, a main memory 604 (e.g., read-only memory (ROM), flash memory, dynamic random access memory (DRAM) such as synchronous DRAM (SDRAM)), a static memory 606 (e.g., flash memory, static random access memory (SRAM)), and a data storage device 616, which communicate with each other via a bus 608.

Processing device 602 (e.g., a processor) represents one or more general-purpose processing devices such as a microprocessor, central processing unit, or the like. More particularly, the processing device 602 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 602 may also be one or more special-purpose processing devices such as an application specific integrated circuit (ASIC), a field programmable gate array (FPGA), a digital signal processor (DSP), network processor, or the like. The processing device 602 is configured to execute the VM joiner module 120 to perform the operations discussed herein.

The computer system 600 may further include a network interface device 622. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 620 (e.g., a speaker).

The data storage device or drive unit 616 may include a computer-readable medium 624 for storing instructions associated with the VM joiner module 120 (e.g., instructions corresponding to the methods of FIGS. 1-5 embodying any one or more of the methodologies or functions described herein. The instructions of the VM joiner module 120 may also reside, completely or at least partially, within the main memory 604 and/or within the processing device 602 during execution thereof by the computer system 600, the main memory 604 and the processing device 602 also constituting non-transitory computer-readable media. Instructions executable by the VM joiner module 120 may further be transmitted or received over a network via the network interface device 622.

While the computer-readable storage medium 624 is shown in an illustrative example to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

Although the operations of the methods herein are shown and described in a particular order, the order of the operations of each method may be altered so that certain operations may be performed in an inverse order or so that certain operation may be performed, at least in part, concurrently with other operations. In another example, instructions or sub-operations of distinct operations may be in an intermittent and/or alternating manner.

In the foregoing description, numerous details have been set forth. It will be apparent, however, to one skilled in the art, that embodiments of the present disclosure may be practiced without these specific details. In some instances, well-known structures and devices are shown in block diagram form, rather than in detail, in order to avoid obscuring the present disclosure.

Some portions of the detailed descriptions are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the foregoing discussion, it is appreciated that throughout the description, discussions utilizing terms such as ""identifying", "creating", "installing", "configuring", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general purpose systems may be used with programs in accordance with the teachings herein, or it may prove convenient to construct more specialized apparatus to perform the required method steps. In addition, embodiments of the present disclosure are not described with reference to any particular programming language. It will be appreciated that a variety of programming languages may be used to implement the teachings of the disclosure as described herein.

Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus. Embodiments of the present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., carrier waves, infrared signals, digital signals, etc.)), etc.

The terms "first," "second," "third," "fourth," etc. as used herein are meant as labels to distinguish among different elements and may not necessarily have an ordinal meaning according to their numerical designation.

It is to be understood that the above description is intended to be illustrative, and not restrictive. Many other examples will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
   identifying a first virtual machine (VM) executing a first operating system (OS) for joining with a second VM executing a second OS, wherein the first OS and the second OS are compatible; and
   creating, by a processing device, a new VM associated with a new disk comprising contents of a first existing disk of the first VM and a second existing disk of the second VM.

2. The method of claim 1, further comprising:
   creating a first copy of the first existing disk and a second copy of the second existing disk;
   establishing a first folder and a second folder on the new disk; and
   installing the first copy on the first folder of the new disk and the second copy on the second folder of the new disk.

3. The method of claim 1, further comprising:
   creating a first copy of the first existing disk and a second copy of the second existing disk;
   partitioning the new disk into a first partition and a second partition; and
   installing the first copy on the first partition of the new disk and the second copy on the second partition of the new disk.

4. The method of claim 1, further comprising:
   creating a first snapshot of the first existing disk, wherein the first snapshot is created without downtime for the first VM;
   creating a second snapshot of the second existing disk, wherein the second snapshot is created without downtime for the second VM; and
   installing the first snapshot and the second snapshot merged on the new disk of the new VM.

5. The method of claim 4, wherein the first snapshot comprises a backup of the first existing disk, wherein the first existing disk remains available for read and write operations during the backup.

6. The method of claim 1, further comprising:
   copying the first existing disk to a first memory location of the new disk; and
   copying the second existing disk to a second memory location of the new disk.

7. The method of claim 6, wherein the first memory location comprises a first memory range of the new disk and the second memory location comprises a second memory range of the new disk.

8. The method of claim 1, wherein the first OS and the second OS are identified as compatible by determining that the first OS and the second OS comprise a same operating system type and a same operating system version.

9. A non-transitory computer readable storage medium comprising instructions that, when executed by a processing device, cause the processing device to:
   identify a first virtual machine (VM) executing a first operating system (OS) for joining with a second VM executing a second OS, wherein the first OS and the second OS are compatible; and
   create, by the processing device, a new VM associated with a new disk comprising contents of a first existing disk of the first VM and a second existing disk of the second VM.

10. The non-transitory computer readable storage medium of claim 9, the processing device to:
    create a first copy of the first existing disk and a second copy of the second existing disk;
    establish a first folder and a second folder on the new disk; and
    install the first copy on the first folder of the new disk and the second copy on the second folder of the new disk.

11. The non-transitory computer readable storage medium of claim 9, the processing device to:
    create a first copy of the first existing disk and a second copy of the second existing disk;
    partition the new disk into a first partition and a second partition; and
    install the first copy on the first partition of the new disk and the second copy on the second partition of the new disk.

12. The non-transitory computer readable storage medium of claim 9,
    create a first snapshot of the first existing disk, wherein the first snapshot is created without downtime for the first VM;
    create a second snapshot of the second existing disk, wherein the second snapshot is created without downtime for the second VM; and
    install the first snapshot and the second snapshot merged on the new disk of the new VM.

13. The non-transitory computer readable storage medium of claim 12, wherein the first snapshot comprises a backup of the first existing disk, wherein the first existing disk remains available for read and write operations during the backup.

14. The non-transitory computer readable storage medium of claim 9, further comprising:
    copying the first existing disk to a first memory location of the new disk; and
    copying the second existing disk to a second memory location of the new disk.

15. The non-transitory computer readable storage medium of claim 14, wherein the first memory location comprises a first memory range of the new disk and the second memory location comprises a second memory range of the new disk.

16. The non-transitory computer readable storage medium of claim 9, wherein the first OS and the second OS are identified as compatible by determining that the first OS and the second OS comprise a same operating system type and a same operating system version.

17. A system comprising:
    a memory comprising instructions; and a processing device operatively coupled to the memory, the processing device to execute the instructions to:

identify a first virtual machine (VM) executing a first operating system (OS) for joining with a second VM executing a second OS, wherein the first OS and the second OS are compatible; and create, by the processing device, a new VM associated with a new disk comprising contents of a first existing disk of the first VM and a second existing disk of the second VM.

18. The system of claim 17, the processing device to:

create a first copy of the first existing disk and a second copy of the second existing disk;

partition the new disk into a first partition and a second partition; and install the first copy on the first partition of the new disk and the second copy on the second partition of the new disk.

19. The system of claim 17, the processing device to:

create a first snapshot of the first existing disk, wherein the first snapshot is created without downtime for the first VM;

create a second snapshot of the second existing disk, wherein the second snapshot is created without downtime for the second VM; and install the first snapshot and the second snapshot merged on the new disk of the new VM.

20. The system of claim 17, wherein the first OS and the second OS are identified as compatible by determining that the first OS and the second OS comprise a same operating system type and a same operating system version.

* * * * *